US012578868B1

(12) United States Patent
Zhu et al.

(10) Patent No.: US 12,578,868 B1
(45) Date of Patent: Mar. 17, 2026

(54) RESONANCE MITIGATION FOR A SYSTEM-ON-CHIP MEMORY SUBSYSTEM

(71) Applicant: Synopsys, Inc., Mountain View, CA (US)

(72) Inventors: Jun Zhu, San Jose, CA (US); Santanu Chaudhuri, Mountain View, CA (US); Luis Filipe dos Santos Simões, Lisbon (PT); Howard David, Portland, OR (US)

(73) Assignee: Synopsys, Inc., Sunnyvale, CA (US)

( * ) Notice: Subject to any disclaimer, the term of this patent is extended or adjusted under 35 U.S.C. 154(b) by 77 days.

(21) Appl. No.: 18/098,610

(22) Filed: Jan. 18, 2023

(51) Int. Cl.
G06F 3/06 (2006.01)

(52) U.S. Cl.
CPC .......... G06F 3/0619 (2013.01); G06F 3/0653 (2013.01); G06F 3/0673 (2013.01)

(58) Field of Classification Search
CPC . G06F 12/08; G06F 11/30; G06F 3/06; G06F 11/07; G06F 11/10
USPC .................................. 711/154, 167; 365/194
See application file for complete search history.

(56) References Cited

U.S. PATENT DOCUMENTS

| | | | | | |
|---|---|---|---|---|---|
| 7,340,617 | B1 * | 3/2008 | Wewel | .................. | G06F 1/3268 |
| | | | | | 713/323 |
| 9,619,010 | B1 * | 4/2017 | Marathe | ................ | G06F 1/3206 |

| | | | | | |
|---|---|---|---|---|---|
| 10,289,555 | B1 * | 5/2019 | Michaud | ............... | G06F 12/109 |
| 2005/0160189 | A1 * | 7/2005 | McNeill, Jr. | ........ | G06F 11/3423 |
| | | | | | 710/1 |
| 2008/0162855 | A1 * | 7/2008 | Thomas | ................ | G06F 13/161 |
| | | | | | 711/E12.001 |
| 2009/0006719 | A1 * | 1/2009 | Traister | ............... | G06F 12/0804 |
| | | | | | 711/E12.008 |
| 2010/0253406 | A1 * | 10/2010 | Seefeldt | .................. | H03K 5/133 |
| | | | | | 327/161 |
| 2014/0181556 | A1 * | 6/2014 | Eckert | ................... | G06F 1/3296 |
| | | | | | 713/323 |
| 2017/0177218 | A1 * | 6/2017 | Kanno | ................... | G06F 3/0625 |
| 2018/0203498 | A1 * | 7/2018 | Song | ...................... | G06F 1/3275 |
| 2019/0195948 | A1 * | 6/2019 | Kaur | .................... | G11C 29/021 |
| 2020/0401515 | A1 * | 12/2020 | Liang | ................... | G06F 12/0253 |
| 2022/0137848 | A1 * | 5/2022 | Lim | ...................... | G06F 3/0647 |
| | | | | | 711/154 |
| 2022/0366995 | A1 * | 11/2022 | Lu | ........................... | G11C 29/14 |
| 2022/0391002 | A1 * | 12/2022 | Badrieh | .............. | G11C 11/2297 |

* cited by examiner

*Primary Examiner* — Jared I Rutz
*Assistant Examiner* — Elias Young Kim
(74) *Attorney, Agent, or Firm* — Lowenstein Sandler LLP

(57) ABSTRACT

A processing device identifies a repeated memory access pattern in a memory access stream of a memory subsystem, the repeated memory access pattern having a memory access pattern frequency, and determines an accumulated value associated with the repeated memory access pattern. The processing device further determines whether the accumulated value satisfies a threshold criterion associated with the memory access pattern frequency, and responsive to determining that the accumulated value satisfies the threshold criterion, causes a delay period to be introduced to the memory access stream to break the repeated memory access pattern.

17 Claims, 6 Drawing Sheets

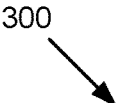

300

Identify memory access pattern and determine associated frequency 305

Is frequency within target range? 310

No

Yes

Decrease accumulated value 340

Identify sub-range of target frequency range and determine associated threshold criterion 315

Calculate duty cycle of pattern and determine associated weighting factor 320

Determine accumulated value using weighting factor 325

Does accumulated value satisfy threshold criterion ? 330

Yes

No

Introduce delay in memory access stream 335

| | |
|---|---|
| FR0 | DCR0 |
| | DCR1 |
| | DCR2 |
| | DCR3 |
| | DCR4 |
| FR1 | DCR0 |
| | DCR1 |
| | DCR2 |
| | DCR3 |
| | DCR4 |
| FR2 | DCR0 |
| | DCR1 |
| | DCR2 |
| | DCR3 |
| | DCR4 |

RESONANCE MITIGATION FOR A SYSTEM-ON-CHIP MEMORY SUBSYSTEM

TECHNICAL FIELD

The present disclosure relates to the field of memory subsystems, and in particular to resonance mitigation for a system-on-chip (SoC) memory subsystem.

BACKGROUND

A system-on-chip (SoC) can have an associated power distribution network (PDN) formed from circuit elements that present both inductive and capacitive effects. These effects can lead to resonance (i.e., increased amplitude) in an impedance profile of the SoC at a certain range of operating frequencies. Due to processing variations present in the circuit elements of the SoC and other external components (e.g., a printed circuit board (PCB)), the frequency range where the resonance is formed can vary from system to system.

SUMMARY

A processing device identifies a repeated memory access pattern in a memory access stream of a memory subsystem, the repeated memory access pattern having a memory access pattern frequency, and determines an accumulated value associated with the repeated memory access pattern. In one embodiment, the repeated memory access pattern in the memory access stream comprises two or more periods of activity separated by one or more idle periods, and the periods of activity comprise at least one of a read operation or a write operation being performed on a memory device in the memory subsystem. The processing device further determines whether the accumulated value satisfies a threshold criterion associated with the memory access pattern frequency, and responsive to determining that the accumulated value satisfies the threshold criterion, causes a delay period to be introduced to the memory access stream to break the repeated memory access pattern.

In one embodiment, the processing device further determines whether the memory access pattern frequency is within a target frequency range associated with the memory subsystem. Responsive to determining that the memory access pattern frequency is within the target frequency range, the processing device identifies a sub-range of a plurality of sub-ranges of the target frequency range with which the memory access pattern frequency is associated. In one embodiment, the threshold criterion is associated with the identified sub-range, and each of the plurality of sub-ranges has a different threshold criterion.

In one embodiment, to determine the accumulated value associated with the repeated access pattern, the processing device calculates a duty cycle of the repeated memory access pattern and determines an associated weighting factor based on the duty cycle, wherein the accumulated value is determined based on the weighting factor. In one embodiment, the threshold criterion associated with the memory access pattern frequency and the associated weighting factor are maintained in a two-level data structure indexed by the plurality of sub-ranges of the target frequency range and a plurality of duty-cycle ranges associated with repeated memory access patterns.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3 is a flow diagram illustrating a method of resonance mitigation for a system-on-chip (SoC) memory subsystem in accordance with some embodiments of the present disclosure.

DETAILED DESCRIPTION

Figure 1:
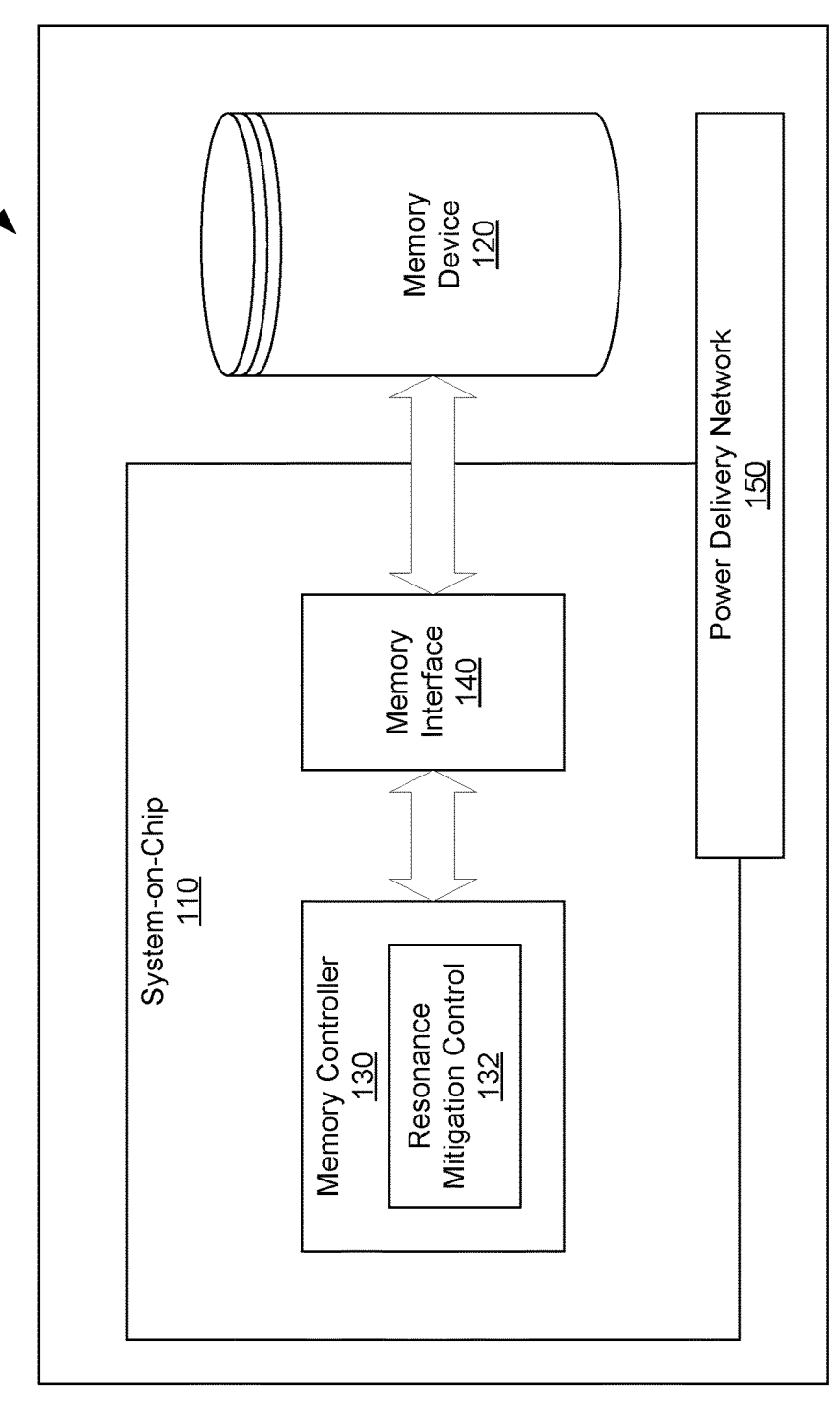
FIG. 1 is a block diagram illustrating an implementation of a memory subsystem configuration in accordance with some embodiments of the present disclosure.

Aspects of the present disclosure relate to resonance mitigation for a system-on-chip (SoC) memory subsystem. One example of a memory subsystem includes a SoC, on which a memory controller and an associated interface can be embodied, and one or more connected memory devices. The memory controller can communicate with the memory devices to perform operations, such as reading data, writing data, or erasing data at the memory devices, and/or other similar operations. A host can utilize such a memory subsystem, such as by providing data to be stored in the memory subsystem or requesting data to be retrieved from the memory subsystem. Depending on the use case, certain access patterns can develop that can cause SOC power grid(s) to go into resonance. For example, the memory controller can have repeated periods of activity (e.g., when a read or write operation is performed on the memory device) separated by periods of inactivity, also referred to herein as idle periods. Such an access pattern can create a specific supply current demand in the SoC during the periods of memory controller activity. Such periodic patterns may be created intentionally (e.g., by hackers) or unintentionally (e.g., as a result of normal command scheduling by the memory controller).

As noted above, the SoC can have an associated power distribution network (PDN) that exhibits resonance in a certain range of operating frequencies. This resonance behavior depends on the design of the system, including the SoC, other components (e.g., PCB) and several associated factors. In addition, different systems may have other resonance behaviors (e.g., resonance frequency, quality factor, bandwidth). In certain memory subsystems, there are two main supply power distribution networks. One includes front-end transmit and receive input/output (IO) circuits (e.g., "VDDQ" which is merely one example of the power supply name and can vary depending on the implementation), which can share its connectivity with the memory device. Another includes back-end circuitry powered by a supply power distribution network (e.g., "VDD" which is merely one example of the power supply name and can vary depending on the implementation), which typically has a different voltage setting than VDDQ. This supply can commonly be shared in the SoC by all circuits in the same or similar domain. When the supply current utilized during the active periods of the memory controller convolutes with the resonance of the PDN, supply voltage noise can be created, potentially leading to performance degradation and failures in the memory subsystem. The power supply voltage noise can occur in either one of the supply power distribution networks described above. Depending on the circuitry implementation, the voltage noise may impact VDDQ and VDD supplied circuits differently and with different weights. System failures caused by induced supply voltage ripple noise (e.g., in VDD/VDDQ) include performance degradation, timing violations and clock skews, over/under voltage derived reliability concerns, etc.

Certain memory systems attempt to prevent resonance induced failures, by introducing an additional number of on-package decoupling capacitors (e.g., within the SoC) and/or an additional number of on-die decoupling capacitors (e.g., within the memory device). While these additional decoupling capacitors can reduce or shift the resonance (e.g., to a different frequency range), additional space is utilized. The amount of power distribution design real estate allocated for these capacitors can become costly (e.g., due to the large amount of decoupling capacitors/area on-die and the usage of on-package decoupling capacitors).

Aspects of the present disclosure address the above and other deficiencies by providing resonance mitigation control within the memory controller. For example, processing logic in the memory controller can monitor repeated memory access patterns (e.g., active-idle) across a wide frequency range, and can calculate an accumulated value caused by those repeated patterns. When the accumulated value reaches the preset thresholds for a particular frequency range, the controller can break the repetition of the pattern (e.g., by introducing additional idle periods to the command sequence) to mitigate the potential resonance in the system and its effects in the SoC. Consequently, the need for decoupling capacitors can be reduced and the level of noise in the associated PDN can be improved as well. The entire memory subsystem becomes more cost-effective and has better performance.

FIG. 1 is a block diagram of an implementation of a system configuration in accordance with some embodiments of the present disclosure. Illustrated is a memory subsystem 100 including a system-on-chip (SoC) 110, one or more memory devices, such as memory device 120, and an associated power delivery network (PDN) 150. The one or more memory devices can include any combination of different types of non-volatile memory devices and/or volatile memory devices. The volatile memory devices can be, but are not limited to, random access memory (RAM), such as dynamic random access memory (DRAM), or synchronous dynamic random access memory (SDRAM). The non-volatile memory devices can be, but are not limited to not-and (NAND) type flash memory and write-in-place memory, such as a three-dimensional cross-point ("3D cross-point") memory device, which includes a cross-point array of non-volatile memory cells. The memory subsystem 100 can be one representation of a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, or a hard disk drive (HDD). Examples of memory modules include a dual in-line memory module (DIMM), a small outline DIMM (SO-DIMM), and various types of a non-volatile dual in-line memory module (NVDIMM). In one embodiment, memory device 120 can be implemented directly on or within SoC 110, such as in a package on a package (POP) or a single in-line package (SoP), rather than being connected to SoC 110 externally.

The SoC 110, for example, can be coupled to a host system and can receive memory access commands from the host system indicating requested memory access operations, such as read or write operations, to be performed on the memory subsystem 100. In one embodiment, SoC 110 includes a memory controller 130 and a memory interface 140. The memory controller 130 can receive the memory access commands from the host system and can communicate with the memory device 120 through memory interface 140 to perform operations such as reading data, writing data, or erasing data at the memory device 120 and other such operations. In one embodiment, memory interface 140 is Physical (PHY) interface that converts digital signals and commands from memory controller 130 into waveforms that memory device 120 can interpret. The memory controller 130 can include hardware such as one or more integrated circuits and/or discrete components, a buffer memory, or a combination thereof. The hardware can include a digital circuitry with dedicated (i.e., hard-coded) logic to perform the operations described herein. The memory controller 130 can be a microcontroller, special purpose logic circuitry (e.g., a field programmable gate array (FPGA), an application specific integrated circuit (ASIC), etc.), or another suitable processor.

In one embodiment, memory controller 130 further includes processing logic, such as resonance mitigation control logic 132 which can monitor repeated memory access patterns of memory device 120 (e.g., active-idle) across a wide frequency range, and can calculate an accumulated value caused by those repeated patterns. When the accumulated value reaches the preset thresholds for a particular frequency range, the resonance mitigation control logic 132 can break the repetition of the pattern (e.g., by introducing additional idle periods to the command sequence) to mitigate potential resonance associated with the PDN 150 in the SoC 110. Additional details regarding the operations of resonance mitigation control logic 132 are provided below.

Figures 2A, 2B:
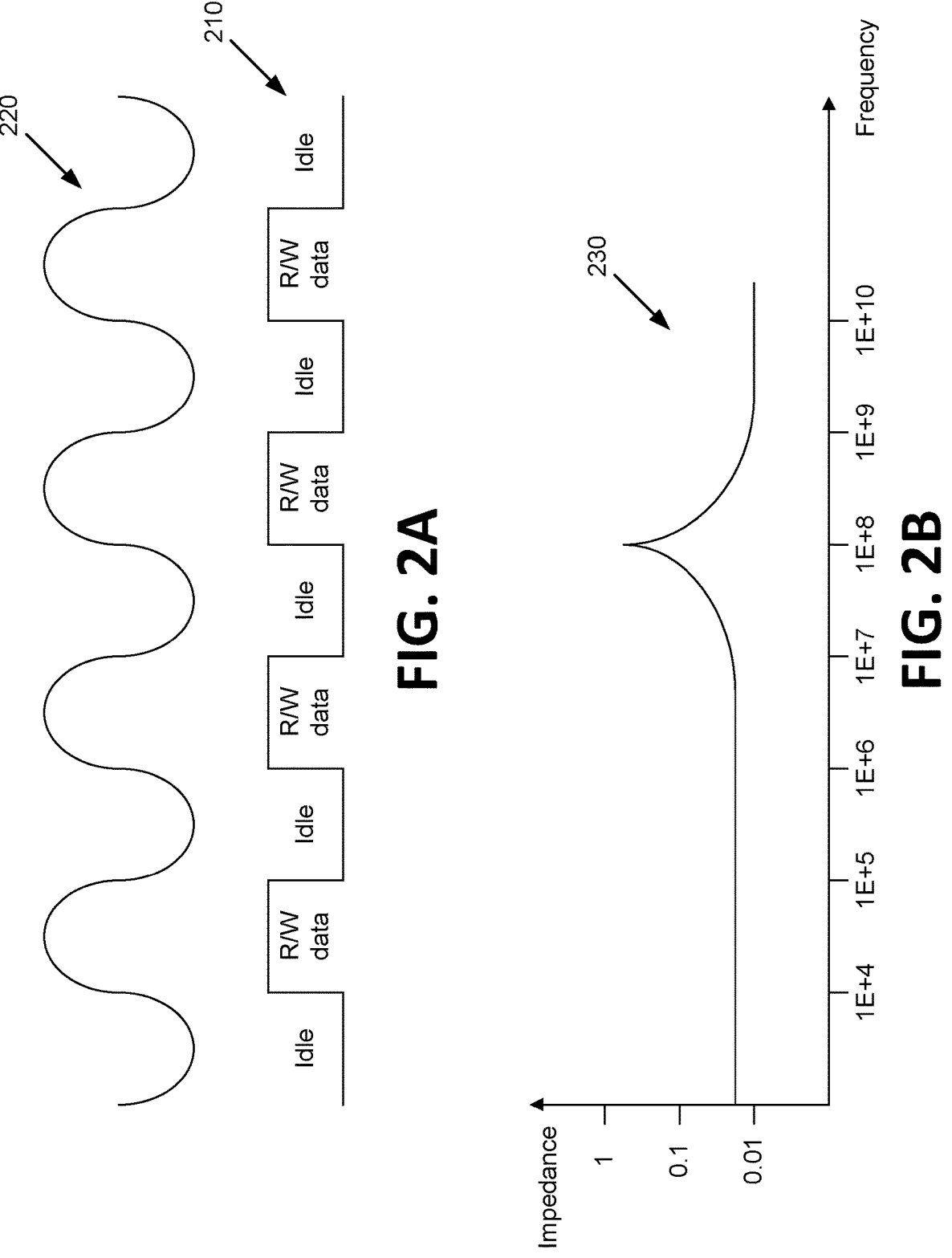
FIG. 2A illustrates a repeated memory access pattern in a memory subsystem in accordance with some embodiments of the present disclosure.
FIG. 2B illustrates the impedance response of a power delivery network in a memory subsystem in accordance with some embodiments of the present disclosure.

FIG. 2A illustrates a repeated memory access pattern in a memory subsystem in accordance with some embodiments of the present disclosure. In one embodiment, a memory access stream 210 represents a sequence of requests/commands received from a host system at memory controller 130. The requests/commands can be received and processed in a memory access pattern, such as including periods of activity where read or write data is transmitted and separated by idle periods. In some embodiments, such active periods and idle periods can be repeated over a period of time in a consistent memory access pattern frequency. Memory access stream 210 illustrates such a repeated memory access pattern beginning with an idle period ("Idle) for a certain amount of time, followed by an active period ("R/W data"). That first active period is followed by a subsequent idle period and then another active period, and so on. The active periods can be defined as periods of time when any of memory access requests or commands are received at memory controller 130 (e.g., from a host system), when memory controller 130 is processing received requests or commands (e.g., performing logical to physical address translation, forwarding the requests or commands to memory device 120 via memory interface 140), when memory controller 130 is receiving requested data from memory device 120, when memory controller 130 is transferring data or an acknowledgement signal back to a requestor (e.g., the host system), or when any other operations related to performance of memory access operations are being performed. The idle periods can be defined as periods of time between the active periods when no operations are actively being performed. This can include waiting for new memory access commands or requests to be received, waiting for previous memory access commands or requests to be processed, or scheduled periods of purposeful inactivity.

In one embodiment, the duty cycle of the repeated memory access pattern represents a fraction, percentage or ratio of one period for which a system is active. In one embodiment, resonance mitigation control logic 132 measures (e.g., using an internal high-frequency system clock) a number of clock cycles for which the memory access stream 210 is active versus idle across a number of periods, and determines the average, for example, across those periods. Depending on the embodiment, the duty cycle across each period can vary or can be consistent.

A repeated memory access pattern, such as that shown in memory access stream 210, can produce a certain response in the PDN 150 of the SoC 110 on which memory controller 130 is embodied. This response can be shown in graph 220, which represents the noise in PDN 150.

FIG. 2B illustrates the impedance response of a power delivery network in a memory subsystem in accordance with some embodiments of the present disclosure. As noted above, an SoC embedded in a system, such as SoC 110, can have an associated PDN 150 that exhibits resonance in a certain range of operating frequencies. This resonance behavior depends on the design of the SoC 110 and several associated factors. In addition, different systems may have other resonance behaviors (e.g., resonance frequency, quality factor, bandwidth). Graph 230 illustrates the impedance response of PDN 150, as one example. Graph 230 is an idealized representation of the frequency range (e.g., between 1E+7 and 1E+9) where the dominance shifts from inductive elements of the PDN 150 to the capacitive elements of the PDN 150. Such a shift results in a spike in the observed impedance through that frequency range (e.g., at approximately 1E+8), which can be referred to herein as the resonant frequency.

Embedded circuitry on the SoC 110, such as the memory controller 130 for example, typically has a supply current demand composed of different harmonic frequencies and amplitudes. At times, these frequencies overlap with the resonant frequency range of the PDN 150 and can generate broad supply voltage ripple harmonic content. Overall, the harmonic content of a SOC supply current demand waveform profile can be assessed through an FFT (Fast Fourier Transform). Aspects such as the shape of the waveform, its amplitude, duty cycle, reoccurring frequency, etc., define its harmonic content. The worst condition for the resonance is when the length of the data burst equals the length of the idle time between the bursts (i.e., for the duty cycle=50% for the repeating patterns and the frequency coinciding with the resonant frequency). The resonance maximum voltage amplitude build-up may take some repeats of the active-idle pattern, such as between 2-5 repetitions, for example. One solution, therefore, is to detect such degenerate patterns well within this time. The resonance can still strike if the repeating patterns deviate from 50%, keeping the frequency the same, however, the strength of the resonant power grid ripple may get reduced.

FIG. 3 is a flow diagram illustrating a method of resonance mitigation for a system-on-chip (SoC) memory subsystem in accordance with some embodiments of the present disclosure. The method 300 may be performed by processing logic that comprises hardware (e.g., circuitry, dedicated logic, programmable logic, microcode, etc.), software (e.g., instructions run on a processor to perform hardware simulation), or a combination thereof. In one embodiment, method 300 may be performed by resonance mitigation control logic 132, as shown in FIG. 1.

Referring again to FIG. 3, at operation 305, the processing logic identifies a repeated memory access pattern in a memory access stream of a memory subsystem, such as memory subsystem 100. In one embodiment, the memory access stream includes a sequence of requests/commands received from a host system at memory controller 130. The requests/commands can be received and processed in a memory access pattern, such as including periods of activity where read or write data is transmitted and separated by idle periods, as shown in FIG. 2A. In some embodiments, such active periods and idle periods can be repeated over a period of time in a consistent memory access pattern frequency. Resonance mitigation control logic 132, for example, can monitor the frequency with which commands are received and processed in the memory access stream and can determine (e.g., after a threshold number of commands) whether a repeated memory access pattern is present. In one embodiment, resonance mitigation control logic 132 determines what the associated frequency is, such as by counting (e.g., using a counter) a number of occurrences of the active period followed by an idle period within a certain amount of time.

At operation 310, the processing logic determines whether the memory access pattern frequency is within a target frequency range associated with the memory subsystem. In one embodiment, the target frequency range represents an entire expected operating frequency range of the memory sub-system. The upper and lower bounds of the target frequency range can be predetermined, and resonance mitigation control logic 132 can compare the memory access pattern frequency determined at operation 305 to the predetermined target frequency range. If the memory access pattern frequency is greater than or equal to a lower bound and less than or equal to an upper bound, resonance mitigation control logic 132 can determine that the memory access pattern frequency is within the target frequency range. If the memory access pattern frequency is not within the target frequency range, the processing logic decreases an accumulated value (if applicable, as will be described with more detail below with respect to operation 340) and processing returns to operation 305 and awaits a subsequent repeated memory access pattern.

Figure 4:
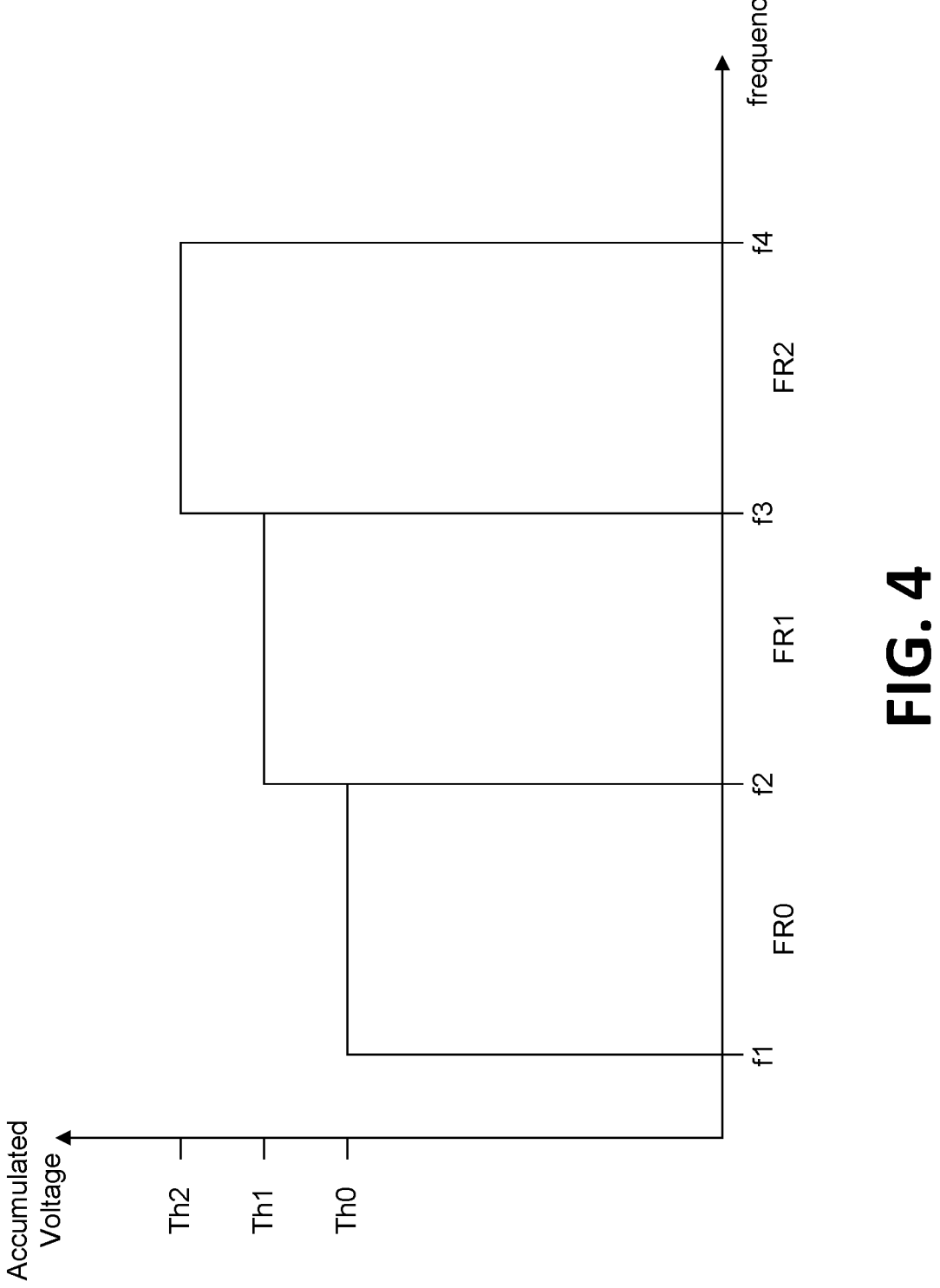
FIG. 4 illustrates a target frequency range and associated thresholds for resonance mitigation in accordance with some embodiments of the present disclosure.

If, however, the memory access pattern frequency is within the target frequency range, at operation 315, the processing logic identifies a sub-range of a plurality of sub-ranges of the target frequency range with which the memory access pattern frequency is associated. For example, as shown in FIG. 4, the target frequency range can be divided into a number of sub-ranges. Sub-range FR0 spans from frequency f1 to frequency f2, sub-range FR1 spans from frequency f2 to frequency f3, and sub-range FR2 spans from frequency f3 to frequency f4. In the illustrated example, the three sub-ranges FR0, FR1, and FR2 make up the entire target frequency range, which spans from frequency f1 to frequency f4. Depending on the embodiment, there can be any number of sub-ranges and each sub-range can cover an equal or a different amount of frequencies. In one embodiment, resonance mitigation control logic 132 can compare the memory access pattern frequency determined at operation 305 to the upper and lower boundaries of each frequency sub-range, and can identify one of those sub-ranges. In one embodiment, each sub-range has an associated threshold criterion. For example, as shown in FIG. 4, sub-range FR0 has a threshold Th0, sub-range FR1 has a threshold Th1, and sub-range FR2 has a threshold Th2. In one embodiment, the threshold criterion associated with each sub-range is different, however, in some embodiments, two or more sub-ranges can have the same threshold criterion. In order to determine the associated threshold criterion, resonance mitigation control logic 132 can identify a corresponding entry in a data structure, such as the two-level data structure 500 illustrated in FIG. 5. In one embodiment, the two-level data structure 500 is indexed by the plurality of sub-ranges of the target frequency range and a plurality of duty-cycle ranges associated with repeated memory access patterns. Having identified the sub-range as one of FR0, FR1, or FR2, resonance mitigation control logic 132 can identify a corresponding entry or entries in the two-level data structure 500 where an indication the associated threshold criterion is maintained.

At operation 320, the processing logic calculates a duty cycle of the repeated memory access pattern. The duty cycle represents the fraction of one period for which a system is active. In one embodiment, resonance mitigation control logic 132 measures (e.g., using an internal high-frequency system clock) a number of clock cycles for which the memory access stream is active versus idle across a number of periods, and determines the average, for example, across those periods. The calculated duty cycle can, for example, fall into one of a plurality of duty cycle ranges, such as DCR0, DCR1, DCR2, DCR3, or DCR4. Depending on the embodiment, there can be any number of duty cycle ranges and each duty cycle range can cover an equal or a different amount of duty cycles.

Figure 5:
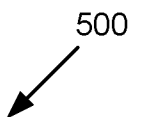
FIG. 5 illustrates a two-level data structure indexed by frequency range and duty cycle for resonance mitigation in accordance with some embodiments of the present disclosure.

In one embodiment, resonance mitigation control logic 132 can further determine an associated weighting factor, such as by identifying a corresponding entry in the two-level data structure 500 illustrated in FIG. 5. Having identified the sub-range as one of FR0, FR1, or FR2, and the duty cycle range as one of DCR0, DCR1, DCR2, DCR3, or DCR4, resonance mitigation control logic 132 can identify a corresponding entry or entries in the two-level data structure 500 where an indication of the associated weighting factor is maintained. By virtue of the two-level data structure 500, there can be different weighting factors for each combination of frequency sub-range and duty cycle range.

At operation 325, the processing logic determines an accumulated value associated with the repeated memory access pattern using the weighting factor determined at operation 320. In one embodiment, there is a default value associated with the repeated memory access pattern and the accumulated value can be incremented by this default value in response to each occurrence of the repeated memory access pattern. In one embodiment, that default value can be modified according to the weighting factor determined at operation 320. For example, depending on the weighting factor associated with the duty cycle of the repeated memory access pattern, the amount by which the accumulated value is increased can be either greater than or less than the default value. With each occurrence of the repeated memory access pattern, the accumulated value can be further incremented by the appropriate amount. In one embodiment, the processing logic employs a register storing the accumulated value which can be incremented over time and read as needed. In one embodiment, the accumulated value functions as a leaky integrator which effectively takes the integral of an input (i.e., accumulates the values associated with the occurrence of the repeated memory access pattern) but gradually leaks a small amount of that input over time (i.e., the accumulated value is periodically decremented, as described in more detail below).

At operation 330, the processing logic determines whether the accumulated value satisfies a threshold criterion associated with the memory access pattern frequency. As described above, at operation 315, resonance mitigation control logic 132 determines a threshold criterion specific to the frequency sub-range with which the memory access pattern frequency is associated. Resonance mitigation control logic 132 can compare the accumulated value to a threshold value defined by the threshold criterion, and if the accumulated value is greater than or equal to the threshold value, can determine that the threshold criterion is satisfied.

If the accumulated value does satisfy the threshold criterion, at operation 335, the processing logic causes a delay period to be introduced to the memory access stream to break the repeated memory access pattern. For example, depending on the embodiment, resonance mitigation control logic 132 can increase the length of an existing idle period in the memory access pattern or can insert an additional idle period. In one embodiment, resonance mitigation control logic 132 can buffer memory access requests for a certain period of time such that the existing idle period between active periods is artificially extended. In another embodiment, resonance mitigation control logic 132 can replace an active period in the memory access pattern with an additional idle period of a fixed length (such that now there are three idle periods in a row before the next active period occurs). Either scenario can break the repetition of the pattern, thereby changing the memory access pattern frequency such that it no longer overlaps with the resonant frequency range of the SoC 110. At operation 340, the processing logic decreases the accumulated value by a certain amount. Depending on the embodiment, the amount by which the accumulated value is decreased can include a fixed amount or can be a certain percentage or fraction of the total accumulated value. The amount by which the accumulated value is decreased can be configurable and can vary depending on the specific implementation, but the accumulated value is generally decreased by some amount each time before processing of method 300 returns to operation 305, where a subsequent memory access pattern is identified.

If the accumulated value does not satisfy the threshold criterion, the processing logic decreases the accumulated value at operation 340, as described above, and identifies a next memory access pattern in the memory access stream and determines the next associated memory access pattern frequency at operation 305.

Figure 6:
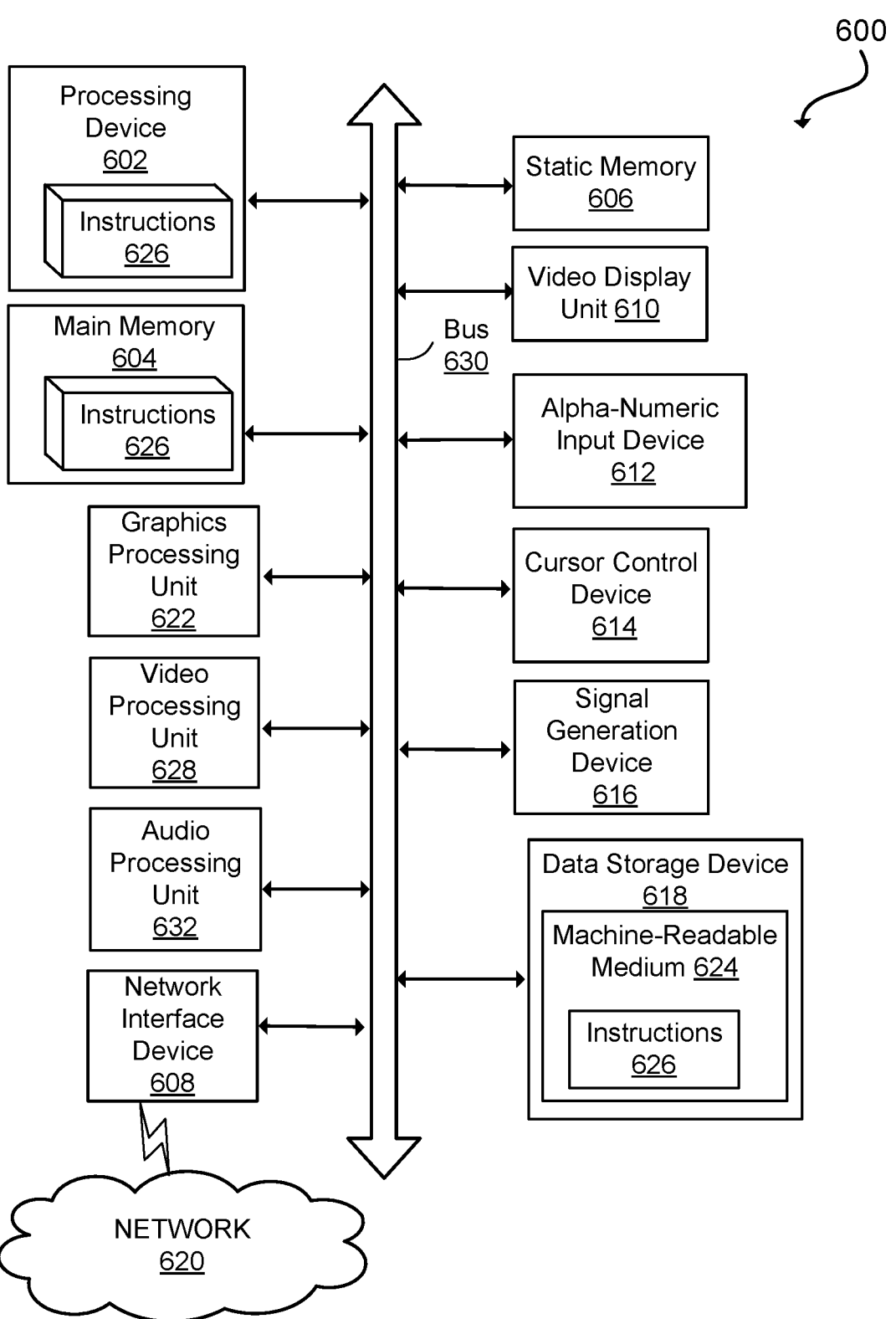
FIG. 6 depicts an abstract diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform a similar sequence of procedures. In addition, the present disclosure is not described with reference to any particular programming language and any one in use in such computer systems may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

identifying, based on a monitoring of a memory access stream of a memory subsystem, a repeated memory access pattern in the memory access stream, the repeated memory access pattern having a memory access pattern frequency representing a repeating sequence of periods of activity of a memory controller separated by idle periods of the memory controller;

measuring, based on the identified repeated memory access pattern, a duty cycle representing a relationship between the periods of activity and the idle periods;

determining a weighting factor based on the duty cycle;

determining an accumulated value that is incremented by an amount based on the weighting factor in response to each occurrence of the repeated memory access pattern;

determining whether the accumulated value satisfies a threshold criterion associated with the memory access pattern frequency; and responsive to determining that the accumulated value satisfies the threshold criterion, causing a delay period to be introduced to the memory access stream to break the repeated memory access pattern.

2. The method of claim 1, wherein the periods of activity comprise at least one of a read operation or a write operating being performed on a memory device in the memory subsystem.

3. The method of claim 1, further comprising:

determining whether the memory access pattern frequency is within a target frequency range associated with the memory subsystem.

4. The method of claim 3, further comprising:

responsive to determining that the memory access pattern frequency is within the target frequency range, identifying a sub-range of a plurality of sub-ranges of the target frequency range with which the memory access pattern frequency is associated, wherein the threshold criterion is associated with the identified sub-range.

5. The method of claim 4, wherein each of the plurality of sub-ranges has a different threshold criterion.

6. The method of claim 5, wherein the threshold criterion associated with the memory access pattern frequency and the associated weighting factor are maintained in a two-level data structure indexed by the plurality of sub-ranges of the target frequency range and a plurality of ranges of duty-cycle values associated with repeated memory access patterns.

7. A memory subsystem comprising:

a memory device; and a system-on-chip (SoC) coupled to the memory device and comprising a memory controller, the memory controller comprising processing logic configured to perform operations comprising:

identifying, based on a monitoring of a memory access stream of the memory subsystem, a repeated memory access pattern in the memory access stream, the repeated memory access pattern having a memory access pattern frequency representing a repeating sequence of periods of activity of a memory controller separated by idle periods of the memory controller;

measuring, based on the identified repeated memory access pattern, a duty cycle representing a relationship between the periods of activity and the idle periods;

determining a weighting factor based on the duty cycle;

determining an accumulated value that is incremented by an amount based on the weighting factor in response to each occurrence of the repeated memory access pattern;

determining whether the accumulated value satisfies a threshold criterion associated with the memory access pattern frequency; and responsive to determining that the accumulated value satisfies the threshold criterion, causing a delay period to be introduced to the memory access stream to break the repeated memory access pattern.

8. The memory subsystem of claim 7, wherein the periods of activity comprise at least one of a read operation or a write operating being performed on a memory device in the memory subsystem.

9. The memory subsystem of claim 7, wherein the processing logic is configured to perform operations further comprising:

determining whether the memory access pattern frequency is within a target frequency range associated with the memory subsystem.

10. The memory subsystem of claim 9, wherein the processing logic is configured to perform operations further comprising:

responsive to determining that the memory access pattern frequency is within the target frequency range, identifying a sub-range of a plurality of sub-ranges of the target frequency range with which the memory access pattern frequency is associated, wherein the threshold criterion is associated with the identified sub-range.

11. The memory subsystem of claim 10, wherein each of the plurality of sub-ranges has a different threshold criterion.

12. The memory subsystem of claim 11, wherein the threshold criterion associated with the memory access pattern frequency and the associated weighting factor are maintained in a two-level data structure indexed by the plurality of sub-ranges of the target frequency range and a plurality of ranges of duty-cycle values associated with repeated memory access patterns.

13. A non-transitory computer-readable storage medium storing instructions which, when executed, cause a processing device to perform operations comprising:

identifying, based on a monitoring of a memory access stream of a memory subsystem, a repeated memory access pattern in the memory access stream, the repeated memory access pattern having a memory access pattern frequency representing a repeating sequence of periods of activity of a memory controller separated by idle periods of the memory controller;

measuring, based on the identified repeated memory access pattern, a duty cycle representing a relationship between the periods of activity and the idle periods;

determining a weighting factor based on the duty cycle;

determining an accumulated value that is incremented by an amount based on the weighting factor in response to each occurrence of the repeated memory access pattern;

determining whether the accumulated value satisfies a threshold criterion associated with the memory access pattern frequency; and responsive to determining that the accumulated value satisfies the threshold criterion, causing a delay period to be introduced to the memory access stream to break the repeated memory access pattern.

14. The non-transitory computer-readable storage medium of claim 13, wherein the periods of activity comprise at least one of a read operation or a write operating being performed on a memory device in the memory subsystem.

15. The non-transitory computer-readable storage medium of claim 13, wherein the instructions cause the processing device to perform operations further comprising:

determining whether the memory access pattern frequency is within a target frequency range associated with the memory subsystem.

16. The non-transitory computer-readable storage medium of claim 15, wherein the instructions cause the processing device to perform operations further comprising:

responsive to determining that the memory access pattern frequency is within the target frequency range, identifying a sub-range of a plurality of sub-ranges of the target frequency range with which the memory access pattern frequency is associated, wherein the threshold criterion is associated with the identified sub-range, each of the plurality of sub-ranges having a different threshold criterion.

17. The non-transitory computer-readable storage medium of claim 16, wherein the threshold criterion associated with the memory access pattern frequency and the associated weighting factor are maintained in a two-level data structure indexed by the plurality of sub-ranges of the target frequency range and a plurality of ranges of duty-cycle values associated with repeated memory access patterns.

* * * * *